(12) United States Patent
Stacey et al.

(10) Patent No.: US 6,434,154 B1
(45) Date of Patent: Aug. 13, 2002

(54) TDM/TDMA DISTRIBUTION NETWORK

(75) Inventors: David John Stacey, Stanstead Abbotts; Simon Daniel Brueckheimer, London; Leslie Derek Humphrey, Harlow, all of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/341,036

(22) PCT Filed: Jan. 16, 1998

(86) PCT No.: PCT/GB98/00139

§ 371 (c)(1), (2), (4) Date: Aug. 23, 1999

(87) PCT Pub. No.: WO98/32307

PCT Pub. Date: Jul. 23, 1998

(30) Foreign Application Priority Data

Jan. 17, 1997 (GB) .............................. 9700930

(51) Int. Cl.$^7$ .......................... H04Q 11/04; H04J 3/16; H04L 12/56

(52) U.S. Cl. .................. 370/395.64; 370/442; 370/458; 370/468; 370/498

(58) Field of Search ........................... 370/395.1, 395.6, 370/395.64, 442, 458, 465, 474, 437, 468, 498, 538

(56) References Cited

U.S. PATENT DOCUMENTS

| | | | |
|---|---|---|---|
| 4,999,835 A | 3/1991 | Lagoutte | 370/94.1 |
| 5,543,951 A | 8/1996 | Moehrmann | 359/158 |
| 5,774,469 A * | 6/1998 | Wirkestrand | 370/473 |
| 5,809,023 A * | 9/1998 | Petersen et al. | 370/336 |
| 5,822,321 A * | 10/1998 | Petersen et al. | 370/471 |
| 6,005,871 A * | 12/1999 | Petersen et al. | 370/310.2 |
| 6,041,054 A * | 3/2000 | Westberg | 370/389 |
| 6,195,353 B1 * | 2/2001 | Westberg | 370/230.1 |
| 6,289,016 B1 * | 9/2001 | Subbiah et al. | 370/235 |
| 6,320,869 B1 * | 11/2001 | Van Driel et al. | 370/443 |
| 6,331,981 B1 * | 12/2001 | Harth et al. | 370/395.1 |

FOREIGN PATENT DOCUMENTS

| | | |
|---|---|---|
| EP | 0 691 758 | 1/1996 |
| WO | WO 96/15599 | 5/1996 |

OTHER PUBLICATIONS

Angelopoulos, "A MAC Protocol for an ATM based Super-PON", Proceedings of Spie. Int. Soc. Opt. Eng., Nov., 1996, vol. 2919, pp. 279–287.

Johnsson, "Support for Low Bitrate Application in ATM Networks", Proceedings of IFIP Workshop on Performance Modelling, Jun. 3, 1996, pp. 39/1–39/14.

Raychaudhuri, "ATM–Based Transport Architecture for Multiservices Wireless Personal Communication Networks", IEEE Journal on Selected Areas In Communication, vol. 12, No. 8, Oct. 1, 1999, pp. 1401–1414.

Kamiyama, "Quasi–STM Transmission Method Based on ATM Network", Proceedings on Global Telecommunications Conference, vol. 3, Nov. 28, 1994, pp. 1808–1814.

* cited by examiner

Primary Examiner—Ricky Ngo
(74) Attorney, Agent, or Firm—Lee, Mann, Smith, McWilliams, Sweeney & Ohlson

(57) ABSTRACT

Communicative services are transported over a TDMA or TDM access network by packetising the services into minicells which minicells are transported within minislots created by subdivision of the TDM time slots. For low bit rate communicative services only, mini-slots are allocated periodically rather than in the blocks that are allocated to high bit rate services. The packetisation delay inherent within the transport layer can be significantly reduced for these low bit rate services.

7 Claims, 8 Drawing Sheets

TDM/TDMA DISTRIBUTION NETWORK

This invention relates to communications networks and in particular to a method and arrangement for facilitating communication in a TDMA network system, such as hybrid fibre/coax (HFC) networks employed in the distribution of cable television services.

BACKGROUND OF THE INVENTION

A recent development in the telecommunications field has been the installation of hybrid fibre/coax networks e.g. for the delivery of cable television services to subscribers. These networks typically comprise a coaxial transmission system disposed between a group of subscribers and the system 'head end' where the coaxial system interfaces with a fibre optic transmission system. In order to generate increased revenue, the operators of these systems have allocated what would otherwise be spare bandwidth to a variety of services such as telephony, video, data and Internet services.

The use of HFC networks for services which can originate from a number of different service providers has necessitated the introduction of operating standards, for example the IEEE802.14 standard to ensure both uniformity of operation and compatibility with existing or legacy transmission systems.

The increasing use of compression in such networks will see voice coding schemes that can operate at bit rates as low as 4 kb/s emerging. It is important that the delivery system should be able to support these services efficiently together with additional communicative services such as multi-media and video-conferencing (e.g. the H323 video conferencing standard). An arrangement for providing communications in a distribution network is described in specification No WO-96-15599-A1. A discussion of techniques for supporting STM traffic with ATM is given by I Gard et al. in ISS '95 World Telecommunications Congress Vol. 1, 23 April 1995, pages 62–66. Echo control in an ATM network is described by Z Tsai et al. in IEEE/ACM Transactions on networking, Vol. 2, No. 1, Feb. 1, 1994, pages 30–39. Techniques for providing communications in a distribution network are described by M Takefman in specification No. WO-96-15599.

A key driver in the development of the IEEE802.14 network standard has been the requirement to enable legacy 64 kb/s PCM services to be delivered over the HFC network. However there is an increasing trend towards the use of voice coding schemes that are both highly compressed and may additionally utilise speech activity detection to operate at bit rates as low as 4 kb/s. In addition to voice, H.323 interactive and MPEG2 distribution is a very powerful service combination enabled by current multimedia PCs. H.323 needs a multi-channel dynamic link to support, G.723 for voice, H.265 for video, H.245 for call handling and T.120 for data conferencing. There is thus a need to future proof the HFC delivery system so that it has the necessary capability to deliver these services in an efficient manner.

Voice quality is a key issue in the delivery of communicative services. The subjective quality is summarised for coding standards in Mean Opinion Scores. A key factor that influences these scores is distortion. Another factor influencing quality is echo signal delay. The ITU has also standardised on a combined delay and echo signal loss plan which is effective below a threshold of 25 ms. Above this threshold echo cancellation must be applied.

However echo cancellation introduces its own distortion. Once again the ITU limits the number of Quantisation Distortion Units (QDUs) on national and international links. It should be noted that even on an ideal 4 wire digital network, there would still be a need for echo cancellation, since all handsets suffer acoustic feedback, especially when brought close to the face. (In free air this is at best 50 dB signal loss, which is not better than the attenuation required at 25 ms mean one way propagation delay.)

It is therefore not feasible from a technical and cost standpoint to liberally spread echo cancellers around the network. Moreover, when interworking with legacy it is sometimes impossible to employ echo cancellation effectively, which should be as close to the far end or echo source as possible.

Clearly it is desirable to minimise unnecessary delay wherever possible. This can ensure as low an impact on existing network delay budgets and echo signal loss plans as possible and also avoid introducing complications and cost in planning newer networks.

These considerations have been a key driver in the definition of AAL-2. ATM packetisation represents a significant proportion of a network delay budget. For example, for legacy 64 kb/s PCM the ATM packetisation delay is approximately 6 ms which is equal to the total network propagation delay of most European national networks. The packetisation delay increases significantly as compression is introduced (e.g. 24 ms for 16 kb/s PCM). With a traditional single channel ATM adaptation layer paradigm, when the packetisation delay exceeds the budget allowance then the traditional option is to sacrifice bandwidth for delay by partially filling the payload. This, particularly at low bit rates can be extremely wasteful of bandwidth as a great deal of dummy information is transported and then discarded on receipt.

In systems employing asynchronous transfer mode (ATM) transmission, the ATM packetisation delay for communicative services represents a significant and sometimes unacceptable proportion of any delay budget. For example, for legacy 64 kb/s PCM services, the ATM packetisation delay (using AAL-1) is approximately 6 ms which is equal to the total network propagation delay of most national networks. The packetisation delay increases dramatically as the amount of compression increases (e.g. 24 ms for 16 kb/s ADPCM). With a traditional single channel ATM adaptation layer paradigm, when the packetisation delay exceeds the budgeted allowance, the traditional option is to sacrifice bandwidth for delay by partially filling the payload—this, particularly at low bit rates may be extremely wasteful of bandwidth and hence the emergence of the AAL-2 paradigm which enables multiple low bit rate channels to be multiplexed into a single ATM payload.

SUMMARY OF THE INVENTION

An object of the invention is to minimise or to overcome this disadvantage.

It is a further object of the invention to provide an improved arrangement and method for the distribution of services over a hybrid fibre/coax network or other TDMA based shared access medium.

According to one aspect of the invention there is provided a method of transporting a communicative service over a TDMA or TDM network by packetising said services into minicells, and transporting the minicells in minislots defined by partition of TDM time slots.

According to another aspect of the invention there is provided method of transporting high and low bite rate communicative services in time slots over a time division multiple access (TDMA) network, the method comprising packetising said services into minicells for transmission within time slots allocated thereto, wherein said time slots are partitioned into a plurality of minislots each capable of accommodating one or more said minicells, and wherein said minislots are allocated in contiguous blocks for said high bit rate services and are allocated individually for said low bit rate services.

The minislots allocated to a low bit rate service may be allocated periodically from successive frames or on an as-needed basis.

According to another aspect of the invention, there is provided a distribution network for providing upstream and downstream high bit rate and low bit rate communicative services to a plurality of user terminals coupled thereto, the network incorporating a head end providing an interface to an ATM network in which user traffic is carried in minicells, wherein upstream communication in said distribution network is effected via a time division multiple access (TDMA) protocol defining a plurality of time slots each of which slots is partitioned into a plurality of minislots, and wherein the network is arranged to allocate said minislots in contiguous blocks for said high bit rate services and individually for said low bit rate services.

The access medium consists of a regular stream of TDMA structures termed mini-slots which are created by subdivision of TDMA time slots and which contain typically 8 bytes of payload data together with associated overhead information. The upstream slots can be concatenated together in order to deliver ATM cells (whole) or variable length fragmented messages. Concatenation of mini-slots is ideal to support the delivery of messaging or higher rate user data. For low bit rate communicative services, this concatenation in the transport layer replicates the packetisation delay incurred by a traditional ATM adaptation layer and is unsuited to the delivery of low bit rate communicative services. However, we have found that by allocating (for low bit rate communicative services only) mini-slots periodically rather than in the conventional blocks, the packetisation delay inherent within the transport layer can be significantly reduced. In particular, the preferred 8 byte mini-slot provides an ideal underlying transport structure even at the very lowest of bit rates and represents a reduction in the underlying packetisation delay of as much as 6 to 1 when compared to the traditional ATM payload. Further, the allocation of bandwidth in this manner can be undertaken at no adverse effect to alternative services.

Effectively, the rate at which minislots are allocated to a particular service is matched to the bit rate of that service so as to minimise packetisation delays while avoiding the need for redundant padding.

The minicells carried within the minislots may be of fixed or variable length.

Allocation of minislots may be performed at the system head end in response to service requests transmitted over a control channel from user terminals.

The use of short minislots together with the combination of minicells enables the greatest flexibility to be achieved in the compromise between low delay and high bandwidth utilisation.

The distribution network may carry multimedia traffic including voice, video and data facilities.

BRIEF DESCRIPTION OF THE DRAWINGS

An embodiment of the invention will now be described with reference to the accompanying drawings in which.

DESCRIPTION OF PREFERRED EMBODIMENT

Figure 1:
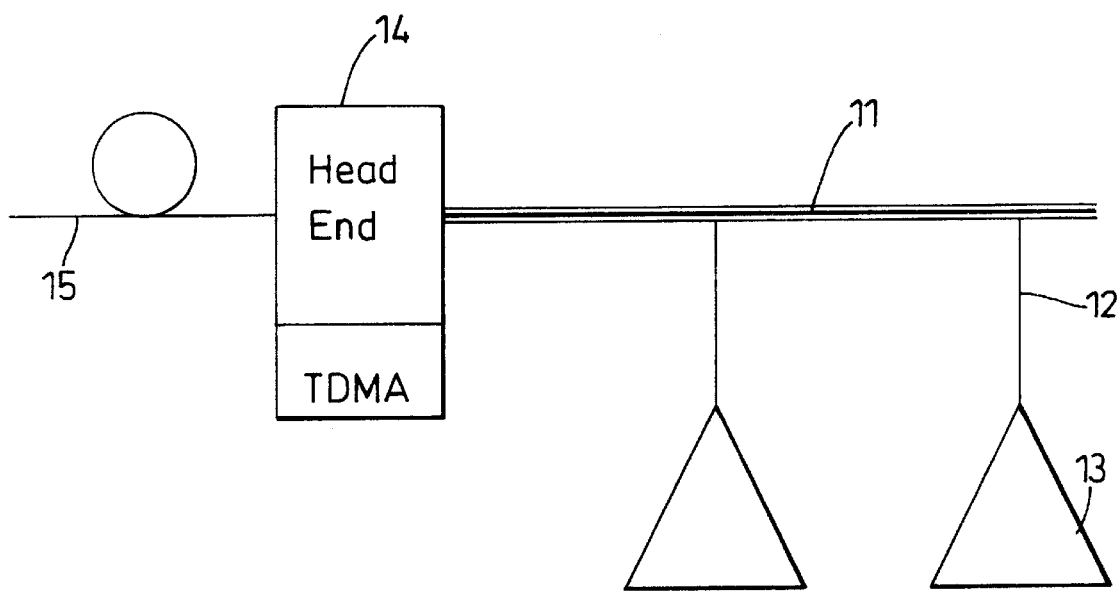
FIG. 1 is a schematic diagram of a hybrid fibre/coax network.

Referring to FIG. 1, the hybrid fibre/coax network comprises a coaxial distribution system 11 having drops 12 to individual subscriber stations 13 and interfacing at the head end 14 with an optical fibre network 15. This is typically a passive optical fibre network (PON). It will be appreciated that the fibre network 15 will generally serve a number of similar coaxial distribution systems. Within the fibre network 15, traffic is carried in ATM cells, e.g. AAL-2 minicells, in both the upstream and downstream directions. In the coaxial network, downstream traffic is broadcast, as each user terminal can identify and receive its own messages. For upstream traffic it is of course necessary to prevent contention between users and for this purpose a time division multiple access (TDMA) protocol is used. In this protocol, each terminal wishing to transmit is allocated a specific time slot or slots for its traffic. A TDMA controller 16 is incorporated in the head end to provide marshalling of the upstream transmissions.

Figure 2:
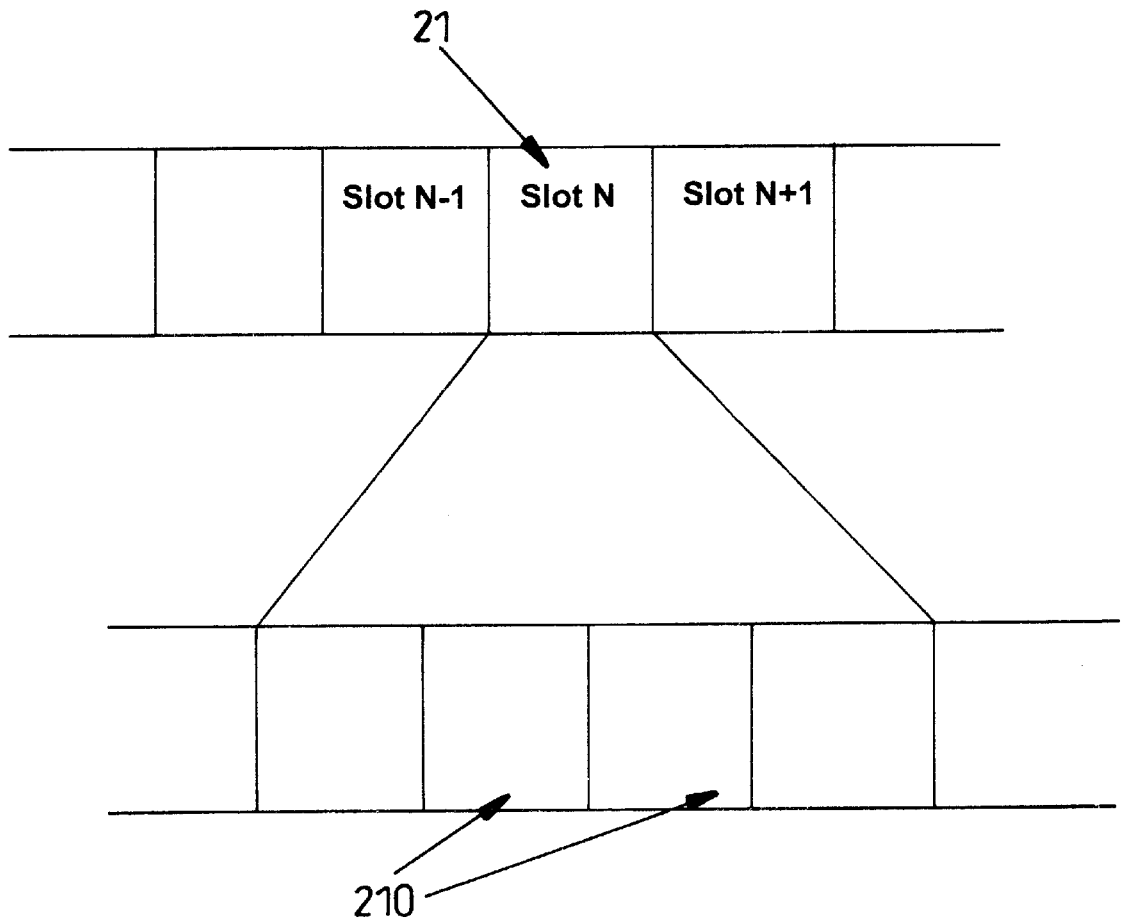
FIG. 2 illustrates an upstream time slot format employed in the network of FIG. 1

To improve the utilisation of the available system upstream bandwidth, we employ a TDMA protocol, illustrated in FIG. 2, in which each time slot 21 is subdivided or partitioned into a number of similar minislots 210 which can be allocated to user traffic on an individual basis In the network of FIG. 1, user data is transported using a transport mechanism that operates asynchronously over mini-slots such that the packetisation of the user channel is tailored to the service and is independent of the mini-slot size. The AAL-2 adaptation layer provides the necessary means to enable this. In addition AAL-2 may be used end-to-end across an ATM network for the delivery of communicative services and thus not incurring any further packetisation delays.

Figure 3:
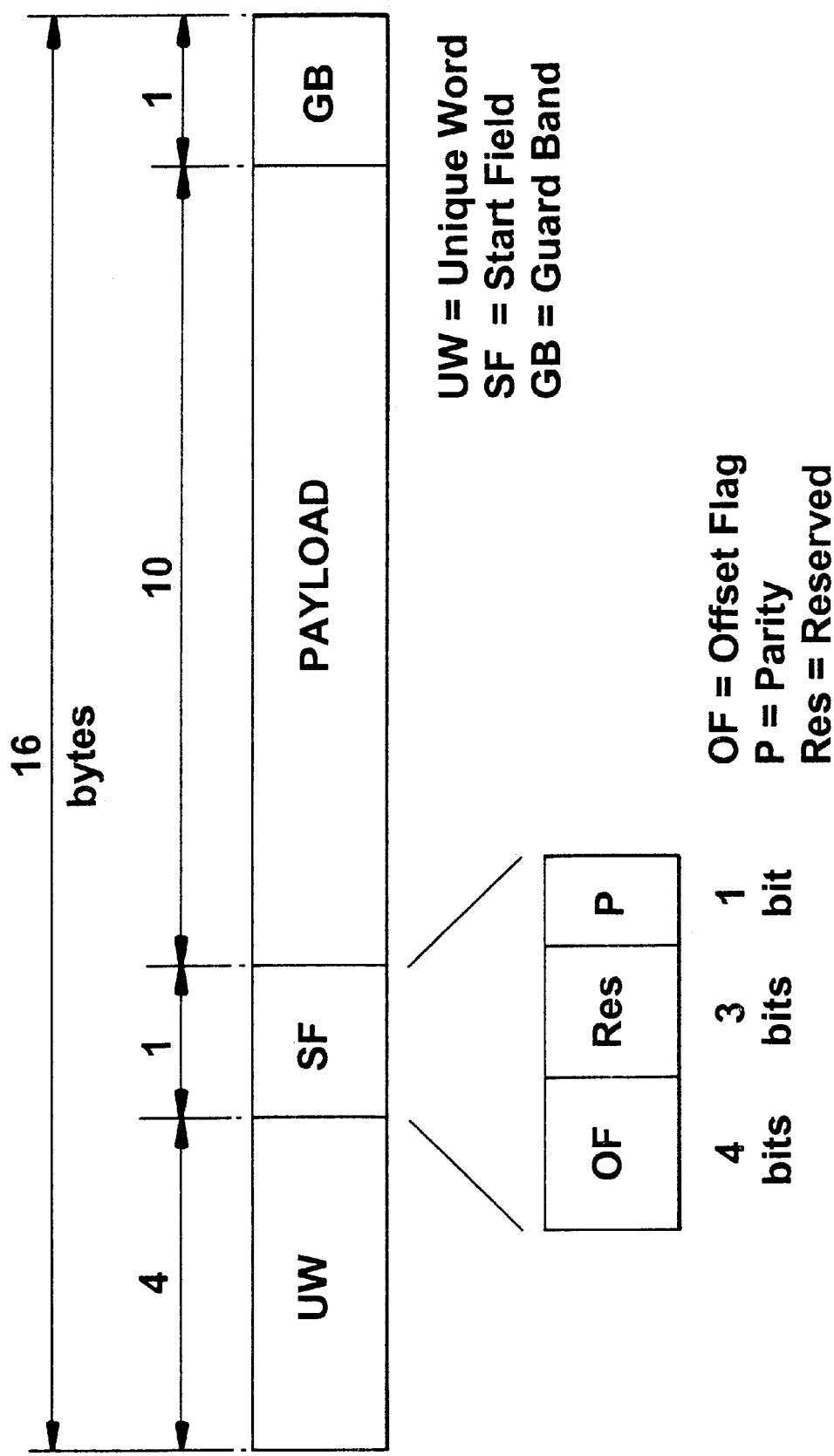
FIG. 3 illustrates a minislot format for use in the time slot format of FIG. 2.

A suitable minislot format is illustrated in FIG. 3 As depicted, the minislot, typically sixteen bytes in length, comprises a unique word (UW) which provides delineation of the minislot, a start field (SF) and a payload. The start field incorporates a pointer indicating the start of the first complete minicell in the payload. A guard band (GB) is provided at the tail end of the minislot. The payload can comprise one or more minicells. It will be appreciated that not all the TDMA time slots need be partitioned in this way and that some time slots may be reserved unpartitioned for allocation to particular services requiring a conventional time slot.

The above preferred definition of the minislot structure meets a number of key objectives:

it is a sub-multiple of the basic slot structure to enables slots and mini-slots to coexist on the same upstream channel;

the format of the mini-slot structure is not tailored to a specific service; it is a general trade-off between the lowest possible bandwidth granularity (and hence minimum packetisation delay) and the ratio of payload size to fixed overhead—a ten byte payload offers a near 5 to 1 reduction in packetisation delay over the ATM cell.

it can support AL-2 (i.e. ATM-less AAL-2) in an efficient manner. The use of AL-2 over the HFC network provides an extremely bandwidth efficient delivery solution that is still compatible with the use of ATM in the core network. ATM AAL-2 can of course also be transported over the minislots if desired.

We have found that the use of AL-2 operating asynchronously over the contentionless minislots as opposed to transporting user data in either a synchronous framing structure or within traditional ATM transport provides key benefits;

AL-2 minicells are asynchronous to the mini-slot structure, such that the minicell payload delay can be tailored to the communicative service and is independent of the minislot size and delivery system;

minicells can be relayed at the head end for transport across the core ATM network (A4 interface) with no additional segmentation and re-assembly and thus no further packetisation delay. In many cases, if a synchronous framing structure were used it would simply defer the packetisation to the head-end;

minicells can be carried end-to-end across the network from STB (set top box) to STB. Thus the technique is fully compatible with the current DAVIC reference models;

AL-2 can be used to support a multi-channel connection between the STB and the head-end for example to support a H.323 based interactive multi-media conferencing session in a single connection;

Since communicative services are connection orientated, they must use slots of a contentionless type. To multiplex this service with signalling and MAC messages over the upstream channel, the user's set top box (STB) must distinguish these services. Therefore there is no disadvantage to use AAL-2 and to distinguish these connections. In fact, since AAL-2 connections support a multiplex of services, only one contentionless stream connection need be configured and distinguished. The bandwidth of the stream can easily be varied by the use of appropriate MAC messages.

Where the minicell channels are multiplexed together over the same circuit, the mini-slot control word is used to house a start field. This start field points to the first mini-cell boundary within the mini-slot payload and is used on initialisation or after error to enable rapid synchronisation to the minicell sequence. There is no requirement for error protection over the mini-slot payload. The service specific sublayer of the AAL-2 protocol allows any minicell error protection to be tailored to the individual service.

Communicative services can be delivered efficienty over the upstream channel in the DAVIC HFC model using AL-2 (headless AAL-2) transported asynchronously over a connection oriented link provisioned using a periodic stream of contentionless mini-slots. In this manner a multi-channel low latency link can be supported between the STB and the HE. The proposed format of the mini-slot structure is shown in FIG. 3 as discussed above.

Figure 4:
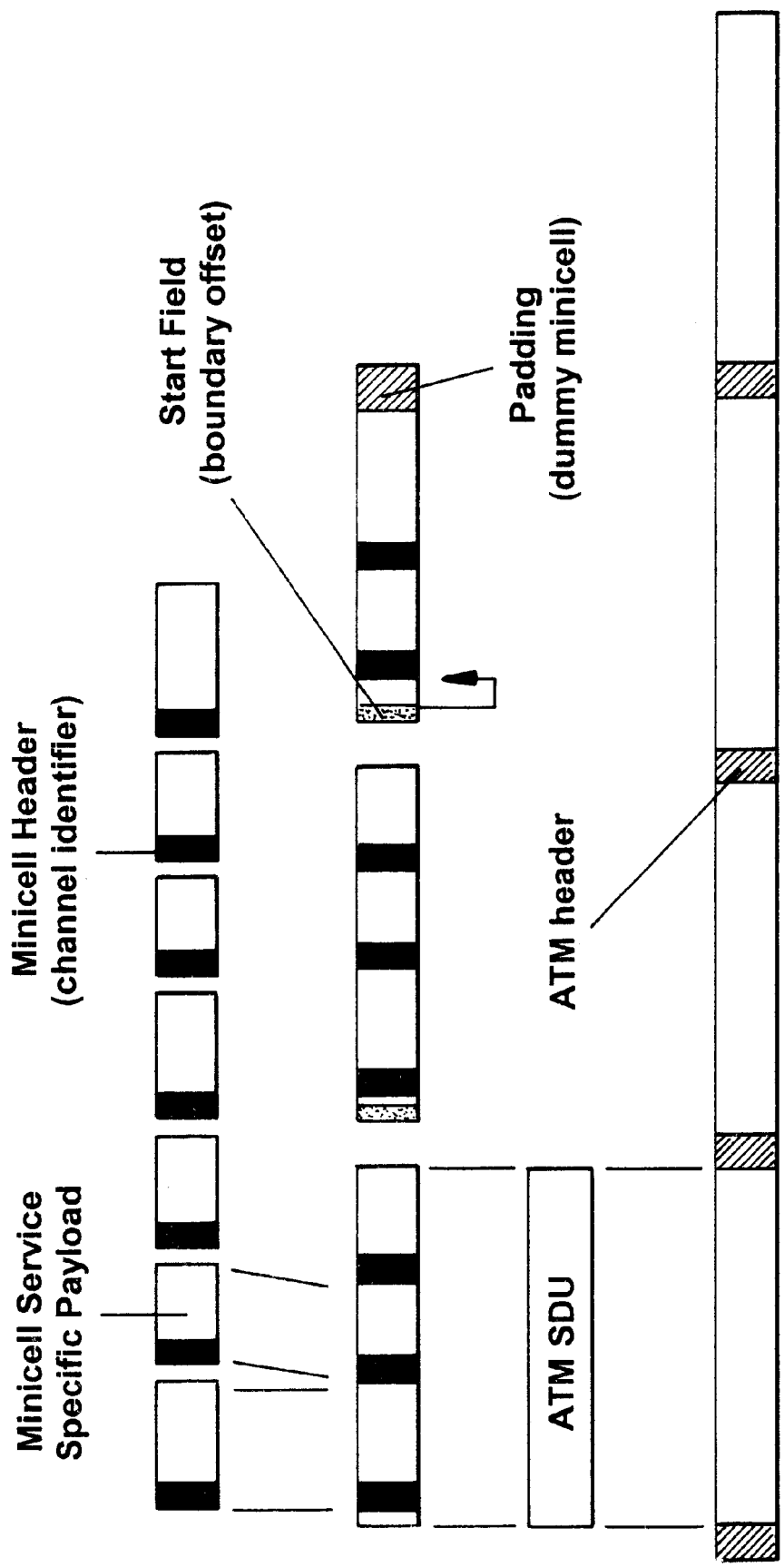
FIG. 4 illustrates the multiplexing of minicells into ATM as employed in the network of FIG. 1.

The AAL-2 adaptation layer of ATM is optimised to cope with the demands of low-bit-rate communications, representing the increasing move towards greater compression. The adaptation layer is a multiplex of users in a single ATM connection, where each user's information is carried in a short packet or minicell, with a header identifying the user channel together with ancillary control information (see FIG. 4).

The adaptation layer is functionally separated into two parts a Common Part Sub-Layer (CPS) and a Service Specific Convergence Sub-Layer (SSCS). The CPS performs the core functions of minicell identification, multiplexing and delivery, whilst the SSCS enables the format of the minicell to be tailored to the specific service requirements of the channel. In this manner AAL-2 can be used to provide a dynamic multi-channel link and can for example transparently support the individual components of a H.323 session.

It will be understood that the minicells may be of variable length to accommodate different services and users.

There are several benefits of this approach, the two main ones being:

low-delay—By having a multiplex of short packets in the payload of a cell, so called minicells, the length of those minicells can be tailored to the bit-rate of the service, and in general do not suffer the ATM cell assembly delay. (A holdover delay can be specified, after which the empty ATM payload is padded out when there is low link utilisation, ensuring an upper limit for delay.);

high link bandwidth utilisation—by multiplexing several users in a connection-orientated manner over a single ATM VC permits a high utilisation of link bandwidth with little or no padding overhead.

User channels through an AAL-2 based VC, are established by Adaptation Negotiation Procedures (ANP) defined in the standard. The ANP operates end-to-end over the VCC, and may be tailored to the user service type. Call establishment and maintenance, and control over the minicell length and other service specific parameters is provided.

AAL-2 is not restricted to single link connections but can be carried end-to-end through an ATM network. The AAL-2 standard specifies a feature due to the multiplexed packet capability, that minicells can be relayed or switched between ATM connections (see FIG. 5).

Figure 5:
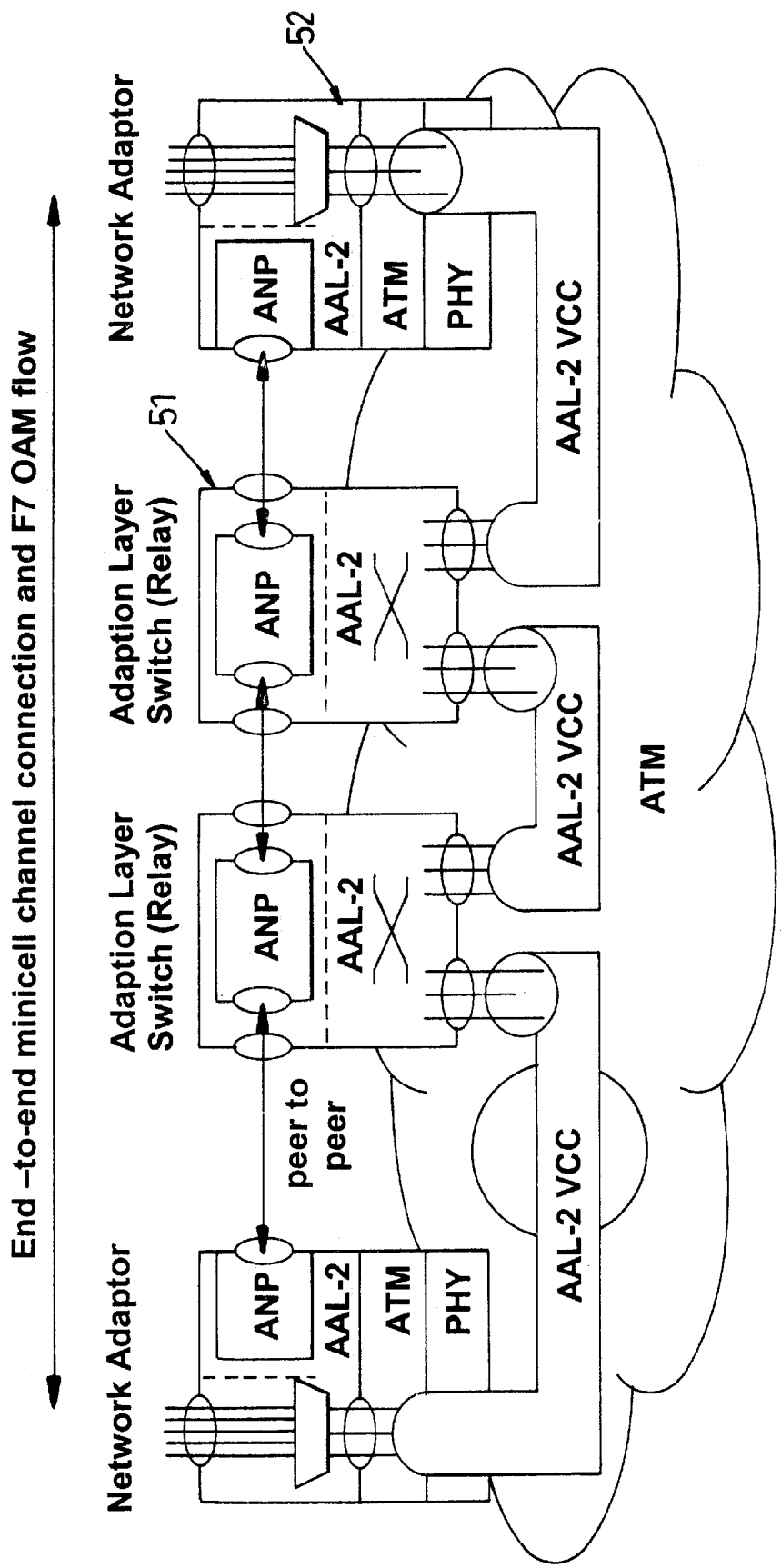
FIG. 5 shows an AAL-2 network reference model employed in the network of FIG. 1.

FIG. 5, illustrates in schematic form the delivery of communicative services in the network of FIG. 1 and shows the end-to-end minicell channel connection and F7 OAM flow. The arrangement of FIG. 5 depicts two types of AAL-2 network nodes: a relay function or Adaptation Layer Switch (ALS) 51, that performs no segmentation and re-assembly (SAR), but simply switches at the adaptation layer; and a Network Adapter (NA) 52 that comprises the AAL-2 termination, and performs adaptation, SAR and concentration.

An important part of this end-to-end connectivity is the Grade of Service (GoS). By having VCs that contain a multiplex of users, the ATM traffic contract for the VC may be specified as a Deterministic Bit Rate (DBR) service, and the bandwidth reserved and re-negotiated over an interval of time that reflects changing aggregated demand on any given link. This essentially creates a low blocking probability for the AAL-2 network. A Network Adapter can therefore route an individual call by ANP alone, with minimal interaction with the ATM layer, with a high degree of success.

In the following section we describe how AAL-2 can be used to provide a low latency transport mechanism for communicative services over the HFC network.

Figure 6:
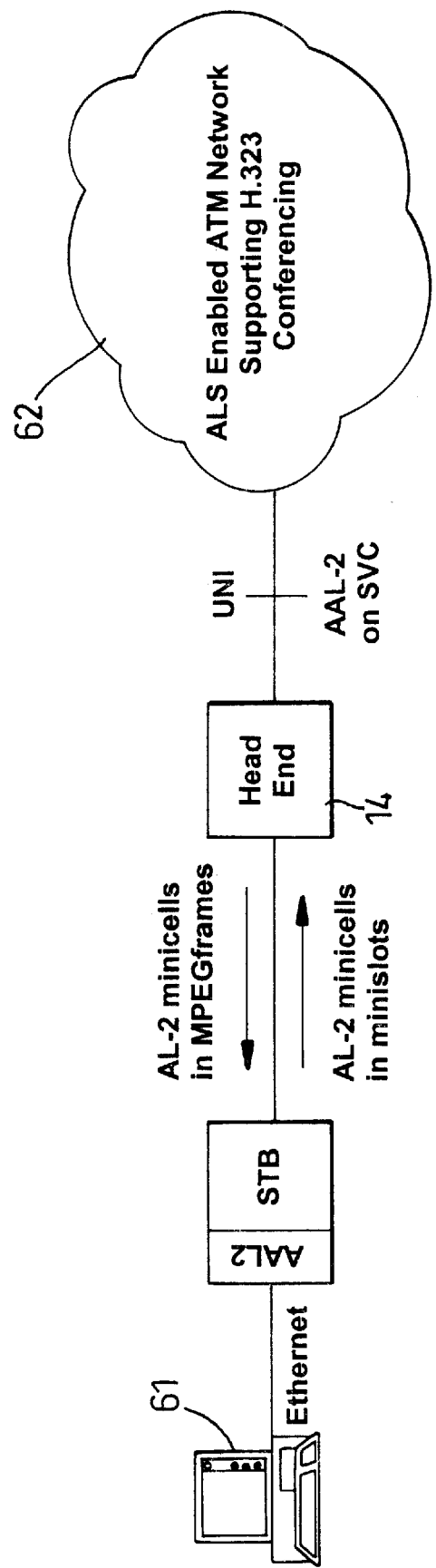
FIG. 6 illustrates the delivery of communicative services in the network of FIG. 1.
Figure 7:
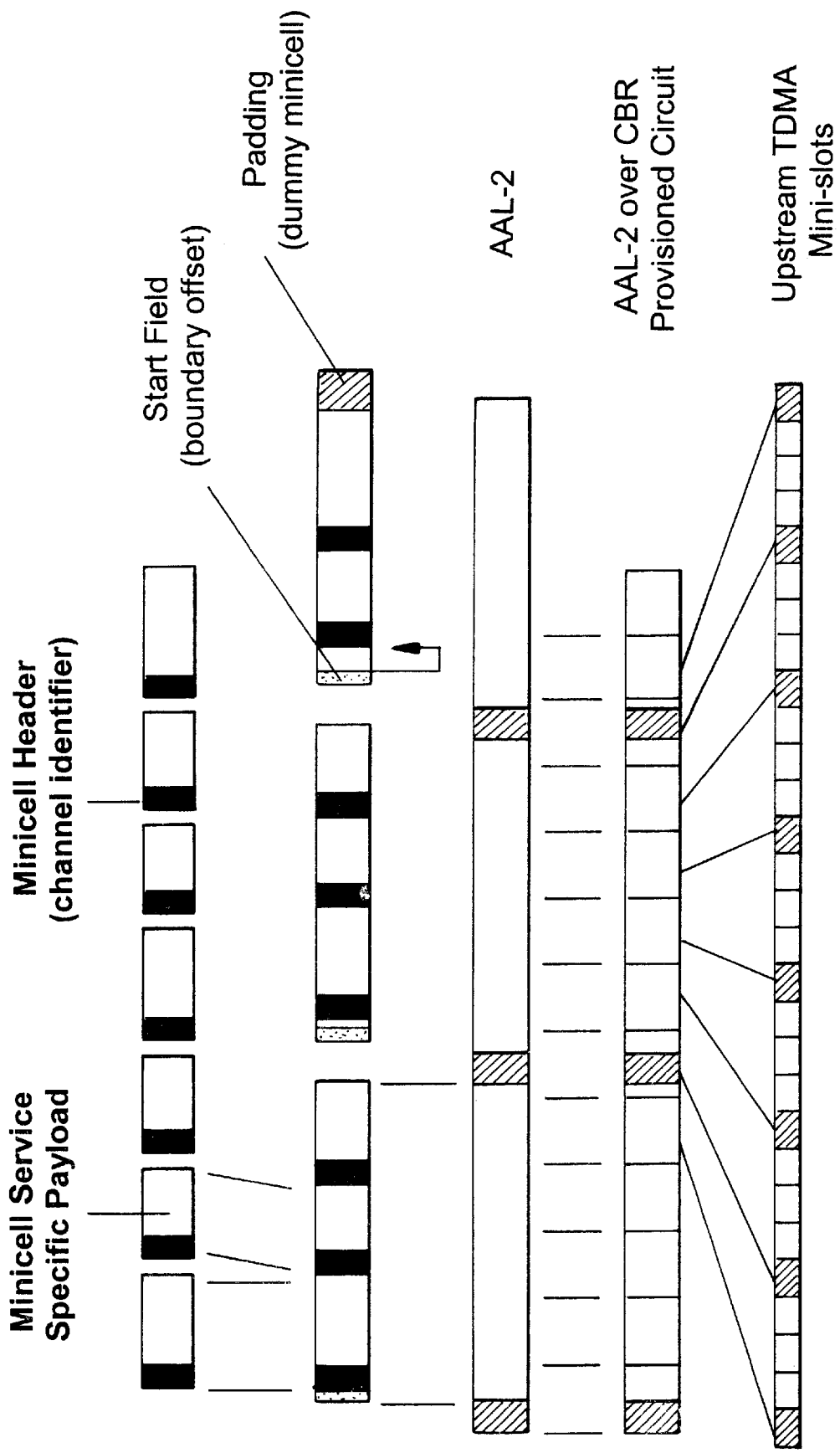
FIG. 7 illustrates the way in which AAL-2 can be transported over the upstream link in the network of FIG. 1.

AAL-2 can be used for the delivery of communicative services in the HFC network of FIG. 1. FIG. 6 shows a schematic diagram of a HFC network enabled for the delivery of interactive conferencing that uses AL-2 minicells in both the upstream and downstream channel. The figure illustrates the connection between an Ethernet terminal 61, via the coaxial network head end 14, and e.g. an ALS enabled ATM network 62 supporting H323 conferencing. In the downstream direction within the coaxial network, the minicells are carried in MPEG frames, and in the upstream direction the minicells are carried in minislots. This has the following advantages:

- the minicells are operate asynchronously to the underlying transport structure, such that the minicell payload delay can be tailored to the communicative service and is thus independent of the access delivery system;
- minicells can be relayed at the head end for transport across the core ATM with no additional segmentation and re-assembly and thus no further packetisation delay. In many cases if a synchronous framing structure were used it would simply defer the packetisation to the head-end
- minicells can be carried end-to-end across the network, from STB to STB;
- AAL-2 can be used to support a multi-channel connection between the STB and the head end for example to support a H.323 based interactive multi-media conferencing session in a single connection;
- minicells can be carried in any regular transport structure not just within ATM payloads;

In FIG. 6, in the example reference diagram in the downstream the minicells are delivered within MPEG frames to illustrate the possibility of transport within any regular structure.

The following section explains the use of AAL-2 In the upstream channel of the HFC network and describes the way in which:

- the use of minislots in the upstream channel provides the basic building block for the delivery of low latency services;
- how the AAL-2 link initialisation parameters of cell rate and holdover delay can be used directly to establish a low-latency circuit for the delivery of communicative services over the upstream channel of the HFC network;
- how multiple user channels from a single STB can be multiplexed using AAL-2 over the upstream link;
- how AAL-2 ANP procedures can be used to set-up and release individual user channels with little interaction with the underlying transport structure;
- the operation at the head-end of the HFC network, and in particular how AAL-2 mini-cells can be switched with no further segmentation and re-assembly (and hence no further packetisation delay) to enable transport across a core ATM network.

In our arrangement, we have found that the use of a minislot structure in the upstream channel provides the capability to allocate upstream bandwidth in a very fine granularity. Currently a mini-slot structure that contains 8 bytes of payload data together with associated overhead is being considered. If required, the upstream minislots can be concatenated together in order to deliver ATM cells (whole) or variable length fragmented messages. Concatenation of mini-slots is ideal to support the delivery of messaging or higher rate user data. However, for low bit rate communicative services, this concatenation in the transport layer replicates the packetisation delay incurred by a traditional ATM adaptation layer and is unsuited to the delivery of low bit rate communicative services.

For low bit rate communicative services only we allocate mini-slots periodically or singly rather than in chunks or blocks. This has been found to reduce the inherent latency of the transport layer significantly. The use of minislots in this manner enables a very fine trade-off to be made in any compromise between low delay and high bandwidth utilisation. For example, an 8 byte minislot represents a reduction in the underlying delay of 6 to 1 when compared to the allocation of bandwidth in full ATM payload blocks.

To support communicative services a low latency connection orientated CBR (continuous bit rate) circuit may be provisioned in the upstream channel of the HFC delivery system.

The AAL-2 VCC establishment parameters link rate and maximum holdover delay can be used directly to provision an upstream circuit between the STB and the head-end. Together the two values can be directly translated to determine a minimum data rate and a maximum period between successive minislots for the upstream circuit.

The delay through the upstream channel is directly related to interval between successive contentionless minislots. Thus it is possible to reduce the delay through the network by decreasing the delay between the successive minislots. Clearly for a link supporting a single service then this implies an over-provisioning of the allocated bandwidth, however two key points should be noted:

- the combination of minicells and minislots enables a very fine trade-off in the delay/bandwidth compromise—much greater than if the bandwidth is allocated in complete ATM cells.
- the increased bandwidth allocation can be used to support additional user channels or data between the STB and the headend; for example a single link can be provisioned to support a multiple-channel interactive conferencing session (using H.323)

The mini-slots are allocated using the CBR request mechanism and thus together a low latency, connection orientated circuit.

The circuit can now be used to transport all communicative services between the STB and the head end. The circuit can coexist on the upstream channel with all existing structures (whole ATM payload and variable length fragments) and existing contention based and reservation based bandwidth allocation methods.

To set-up or release a new user channel the AAL-2 ANP procedures are invoked. A new channel can be established with little interaction with the underlying transport structure. ANP provides call establishment and maintenance procedures which include connection and congestion control features that will determine if the additional channel can be accommodated whilst maintaining the link QoS. If the link can be accommodated then the user channel can be established otherwise the request may be denied. Alternatively ANP has the ability to dynamically re-negotiate the parameters of the VCC link. In this manner it is possible to control the allocation of bandwidth on an aggregated demand basis.

Using AAL-2, the size of the minicell and hence its packetisation delay can be tailored to the individual service, and is not dependent on the mini-slot size. Further, AAL-2 enables multiple low bit rate services between the STB and head end to be multiplexed together on a single link. By way of example, FIG. 6 illustrating the transport of AAL-2 over minislots on the upstream link.

Termination of the link at the head-end is a straightforward operation. The head-end controls the allocation of mini-slots to a station and therefore has implicit knowledge of the station identification and the mini-slots that make up the CBR circuit. Termination and delineation of the minicells is also simple. Initially, the ATM HEC is used to find delineation of the ATM sequence. Delineation of the minicell sequence follows this. The start field that is contained within the first byte of every payload contains a pointer to the first minicell boundary within the cell and is used to find delineation upon initialisation or after error. Once initial delineation has been established, the minicells are self delineating as each minicell contains a control field identifying both the user channel and the length of the data packet.

The release of the individual user channels at the head-end is dependent on the architecture of the core network. For example to interwork with the existing PSTN it is necessary to transpose the packetised data back into the synchronous domain. This may be accomplished by providing a small play-out buffer for each user channel, the length of the play-out being dimensioned so as to compensate for the jitter and statistical multiplexing introduced in the HFC network.

Alternatively if the core network is ATM based then it is possible to transport the service end-to-end using AAL-2 thus avoiding any further packetisation delays. This is performed by the provision of Adaptation Layer Switching technology at the head-end and other strategic points within the network. Note, that in this model the head-end will perform AAL-2 switching only and no further segmentation and re-assembly function is necessary.

For many low bit rate links used within the access network the overhead penalty associated with its header represents a major obstacle to the use of ATM. In this section we highlight the possibility of transporting mini-cells direct without the ATM - termed AL-2) over any regular transport structure used within the access network thus achieving a near 11% uplift in utilisation. The use of AL-2 within the access network is fully inte-operable with the use of standard AAL-2 in the core network-minicells can be switched between AAL-2 and AL-2 using standard AL-2 technology with no additional packetisation delays. The use of AL-2 in this manner is highly suited for the transport of communicative over the upstream link of a HFC network.

AAL-2 has been designed so that minicells are transported asynchronously over ATM cell boundaries. The minicell sequence is essentially self-delineating—the minicell control information provides sufficient information both to identify the user channel (up to 256 user channels over a single link) and the length of the mini-cell data packet. The length of a minicell is targeted to the service it supports and not to the underlying transport structures. This basic paradigm is equally valid for the transport of low bit rate services over any regular transport structure. For example AL-2 can be readily transported within an MPEG frame.

Figure 8:
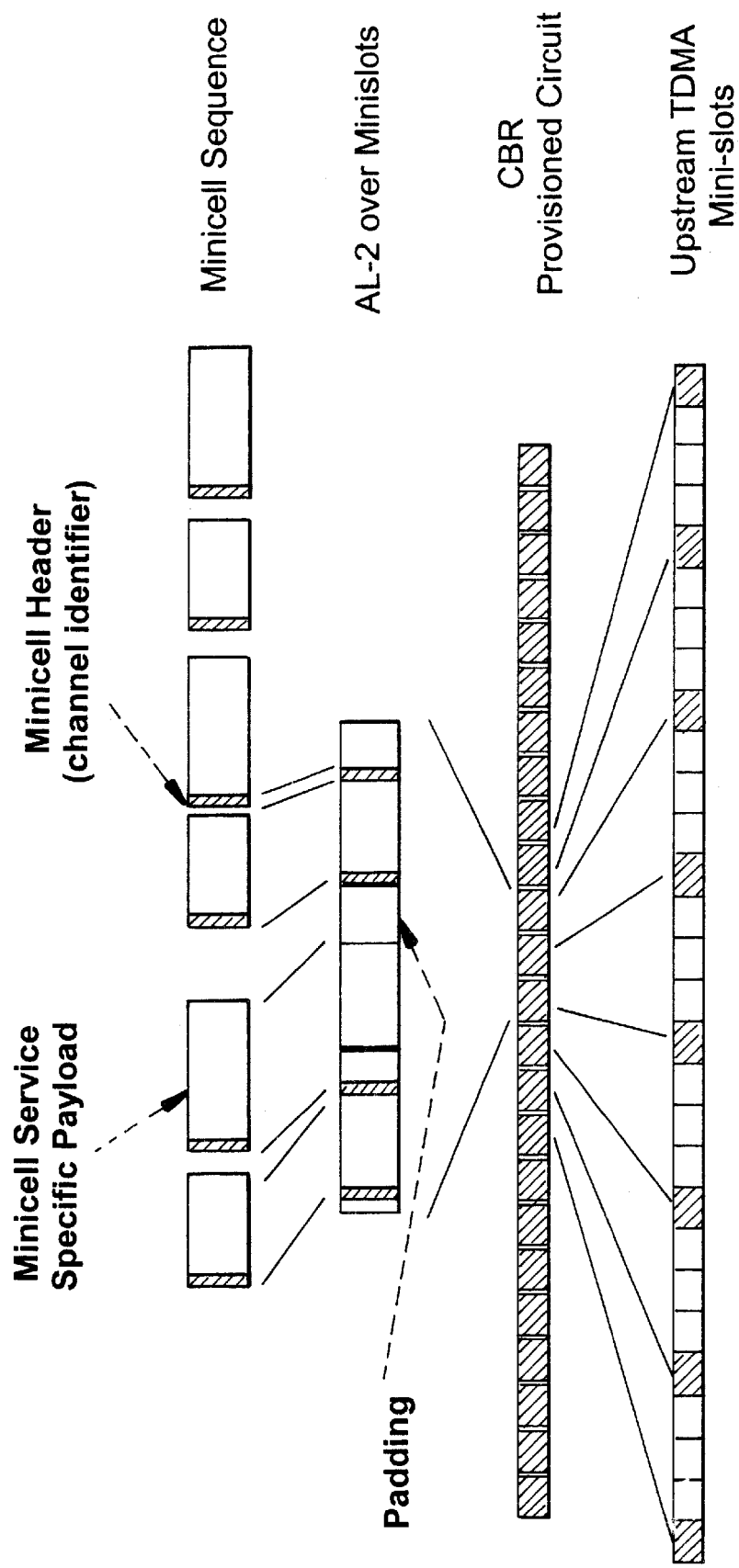
FIG. 8 illustrates the delivery of AL-2 cells over minislots in the network of FIG. 1.

Further, for a point-to-point, connection orientated link, such as the upstream channel in the HFC network, the VCI within the ATM header is redundant since no switching is performed and there is implicit knowledge of the circuit identification. In such cases it is possible to transport AL-2 directly over the raw (regular) transport structure thus attaining a significant uplift in bandwidth utilisation. At the head-end the mini-cells may be freely switched from AL-2 to AAL-2 for delivery across a standard ATM network. The use of AL-2 in the access network potentially offers significant benefits for the delivery of communicative services over the HFC network. This is illustrated in FIG. 8 which shows the delivery of AL-2 minicells over minislots.

To support communicative services a low latency connection orientated circuit needs to be provisioned in the upstream channel of the HFC delivery system. Contentionless transfer, together with the new minislot structure provide the basic building blocks to achieve this.

The AAL-2 VCC establishment parameters link rate and maximum holdover delay can be used directly to provision an upstream circuit between the STB and the head-end. (Holdover delay specifies the maximum packetisation delay for the ATM PDU—if this value is exceeded then a padding function can automatically be invoked). Together the two values can directly translated to determine a minimum data rate and a maximum period between successive contentionless minislots for the upstream circuit. In this way a connection orientated, low latency CBR circuit consisting of a regular stream of contentionless mini-slots is established.

The circuit can now be used to transport low bit rate communicative services between the STB and the ND. The circuit can coexist on the upstream channel with all existing transport structures (slots and mini-slots) and existing contention and reservation based access.

AL-2 enables multiple low bit rate services between the STB and ND to be multiplexed together on the same link—and thus provides the HFC network with the ability to deliver interactive multi-media sessions in a very efficient manner.

The delay through the HFC upstream channel is a direct function of the minicell packetisation delay and the interval between successive contentionless minislots. If this combined delay exceeds a specified budget then it can be decreased by reducing the delay between contentionless minislots. Clearly, reducing the interval between the minislots that form the upstream link implies that the bandwidth has been over-provisioned to support a single service but two key points should be noted:

the combination of minicells and minislots enables a much finer trade-off to be achieved in the delay/bandwidth compromise then is available with the ATM cell/slot paradigm.

the increased bandwidth allocation can be used to support additional user channels or data between the STB and the head-end; for example a single link can be provisioned to support a multiple-channel interactive conferencing session (using H.323)

The inherent low latency achieved by using minicells and minislots can best be illustrated by a number of simplified examples. In these examples we assume a 1.5 Mb/s upstream link that can support a mini-slot rate of 12000 slots/second or a slot rate of 3000 slots/second. In the examples we assume that the AL-2 (or ATM) operates asynchronously to the minislot transport mechanism (or slot). Physical layer delays have been ignored.

EXAMPLE 1

64 kb/s

Assuming a 1 ms packetisation delay for AL-2 then 8 octet samples are multiplexed together to form an 11 octet minicell (including header) every 1 ms. This data rate requires approximately 1100 minislots per second which implies the period between successive minislots is approximately 0.9 ms. The worse case latency for this service is 2.8 ms which is equal to the packetisation delay plus twice the period between minislots (in the worst case a completed minicell must wait a full minislot period until the next minislot, and the minicell will be transported over two minislots). The comparable ATM/slot delay is 12 ms (6 ms packetisation and 6 ms worst case until the next slot becomes available).

EXAMPLE 2

144 kb/s

Again assuming a 1 ms packetisation delay for AL-2 then 21 octet minicells can be generated. This requires approximately 2100 minislots per second and a period between successive minislots of approximately 0.5 ms. The worse case latency for this service is 2.5 ms which is equal to the packetisation delay plus three times the period between minislots (need to wait for three slots to transport the minicell). The comparable ATM/slot delay is 5.2 ms (2.6 ms packetisation and 2.6 ms worst case until the next slot becomes available).

EXAMPLE 3

16 kb/s ADPCM

Again assuming a 1 ms packetisation delay for AL-2 then 5 octet minicells can be generated. This requires approximately 500 minislots per second and a period between successive minislots of approximately 2 ms. The worse case latency for this service is 3 ms which is equal to the packetisation delay plus the period between minislots The comparable ATM/slot delay is 48 ms (24 ms packetisation and 24 ms worst case until the next slot becomes available).

These examples illustrate the feasibility of the technique in accommodating a wide range of bit rates.

The techniques described above are particularly applicable to distribution networks of the DAVIC type or of the IEEE802.14 type. However it will be understood that the network structure described herein are given by way of example only and are in no way considered to be a limitation on the transport technique employed.

It will be understood that the above description of a preferred embodiment is given by way of example only and that various modifications may be made by those skilled in the art without departing from the spirit and scope of the invention.

What is claimed is:

1. A method of transporting high and low bite rate communicative services in a communications network arrangement comprising a passive fibre optic network (15) in which traffic is transported in ATM cells in both upstream and downstream directions, and a local distribution network (11) to which subscriber terminals (13) are connected and in which downstream traffic to said terminals is broadcast and upstream traffic from said terminals is allocated to time slots in a time division multiple access (TDMA) protocol, the method comprising packetising said services for upstream transmission within the local network into minicells for transmission within time slots allocated thereto, wherein said time slots are partitioned into a plurality of minislots each capable of accommodating one or more said minicells, wherein each said minislot comprises a unique word (UW) which provides delineation of the minislot, a start field (SF) and a payload, the start field incorporating a pointer indicating the start of the first complete minicell in the payload, and wherein said minislots are allocated in contiguous blocks for said high bit rate services and are allocated individually for said low bit rate services.

2. A method as claimed in claim 1, wherein said minicells are of variable length.

3. A method as claimed in claim 2, wherein groups of said minicells are assembled into ATM cells for transmission over said passive optical network.

4. A method as claimed in claim 3, wherein a plurality of said low bit rate services are multiplexed together on a single link.

5. A method as claimed in any one of claim 1, wherein the minislots allocated to a said low bit rate service are allocated periodically from successive frames.

6. A network arrangement for providing upstream and downstream high bit rate and low bit rate communicative services to a plurality of user terminals (13) coupled thereto, the arrangement comprising a passive fibre optic network (15) in which traffic is transported in ATM cells in both upstream and downstream directions, a local distribution network (11) to which the subscriber terminals are connected and in which downstream traffic to said terminals is broadcast and upstream traffic from said terminals is allocated to time slots in a time division multiple access (TDMA) protocol, and a head end (14) whereby the local distribution network is interfaced to the passive optical network, wherein the local distribution network incorporates means for packetising said services for upstream transmission within the local network into minicells for transmission within time slots allocated thereto, wherein said time slots are partitioned into a plurality of minislots each capable of accommodating one or more said minicells, wherein each said minislot comprises a unique word (UW) which provides delineation of the minislot, a start field (SF) and a payload, the start field incorporating a pointer indicating the start of the first complete minicell in the payload, and wherein the local distribution network is arranged to allocate said minislots in contiguous blocks for said high bit rate services and individually for said low bit rate services.

7. A distribution network as claimed in claim 6, wherein allocation of said minislots is performed by a TDMA controller (16) disposed at or associated with said head end.

* * * * *